UNITED STATES PATENT OFFICE.

HENRY V. DUNHAM, OF NEW YORK, N. Y.

PROCESS OF PRODUCING SOLUBLE MILK-ALBUMEN.

SPECIFICATION forming part of Letters Patent No. 709,003, dated September 16, 1902.

Application filed October 28, 1901. Serial No. 80,247. (No specimens.)

*To all whom it may concern:*

Be it known that I, HENRY V. DUNHAM, a citizen of the United States, residing at New York, in the county of New York and State of New York, have invented or discovered certain new and useful Improvements in Processes of Producing Soluble Milk-Albumen, of which the following is a specification, reference being had therein to the accompanying drawings.

It is well known that albumen exists in milk, and that this milk-albumen is almost identical in chemical composition with the albumen of eggs. Milk-albumen has, however, so far as I am informed, never become an article of commerce, for the reason that there has heretofore been no known method of coagulating or precipitating the albumen of milk excepting by heat; and milk-albumen which has been coagulated or precipitated in this manner is entirely insoluble, and is therefore not suitable either as an article of food or for use in the arts.

When casein is extracted from the milk by precipitation through the agency of rennet or acids, the albumen is not affected and remains in solution in the whey. I have discovered that if whey containing albumen be concentrated down to a certain thickness the albumen in this thickened or concentrated whey may be precipitated by acid, and that albumen precipitated in this manner is soluble in water and suitable for use in the arts. After the casein has been extracted from milk the resulting whey is slightly acid, as I have discovered, and in carrying my new process into effect this acidity is preferably nearly neutralized by the addition to the whey of approximately one per cent. of ordinary 26° commercial ammonia. After the whey has been thus neutralized it is evaporated in a vacuum pan or otherwise down to a heavy syrup, this evaporation being effected at temperatures less than the coagulating-point of the albumen, the albumen commencing to coagulate in the vicinity of 190° Fahrenheit. In this evaporation of the whey most of the sugar contained therein crystallizes out. The residue in the form of a thick liquid or heavy syrup is then drawn off from the crystallized sugar into a tank, where it is allowed to stand for about twelve hours, or thereabout, to enable most of the remaining milk-sugar to crystallize out, and the remaining liquid, which is somewhat thick, is then strained off. This liquid contains the albumen and a certain very small proportion of uncrystallized milk-sugar. The next step is to precipitate the albumen from this thick liquid, and this is done preferably by the addition to the liquid of about one per cent. of ordinary commercial hydrochloric acid, or in the place of hydrochloric acid any other suitable acid may be used. I have discovered that, owing to the concentrated condition of the liquid containing the albumen, when the acid is applied to the thick liquid the albumen may be readily precipitated by a comparatively small amount of acid, as just stated, although acids will have no precipitating effect on the albumen as it exists in unconcentrated whey or in milk, even if the whey or milk has been slightly evaporated.

The albumen precipitated from the concentrated liquid, as just described, is then removed from the liquid by straining, and is preferably slightly washed in cold water to free it from excess of acid, and is then dried, if it be desired to ship it in dry form, which is its preferable commercial condition.

The albumen prepared in the manner above described with the excess of acid washed out or neutralized with an alkali is perfectly soluble in cold or warm water, and when it is to be prepared for uses in the arts it may be dissolved in cold or warm water containing sufficient alkali to neutralize the acid present, the proportions of alkalized water being governed by the consistency of the albuminous solution desired. This soluble milk-albumen may be used for practically all purposes for which blood and egg albumen are now commonly employed—such as in calico-printing, leather-finishing, &c.—and may be produced at a fractional part of the cost of the albumens heretofore commercially in use.

It will therefore be understood that by means of my invention or discovery I am enabled to utilize what has heretofore been a waste product, resulting in the manufacture of milk-sugar by producing an article of soluble milk-albumen suitable for use in the arts or as a food product.

Having thus described my invention or dis- covery, I claim and desire to secure by Letters Patent—

1. The herein-described process for producing soluble milk-albumen, consisting in reducing the whey containing the albumen and milk-sugar to the form of a heavy syrup, by evaporation at temperatures below the coagulating-point of the albumen, then separating the thickened or concentrated liquid from the crystallized milk-sugar therein, then precipitating the albumen from the concentrated liquid by the addition to such concentrated liquid of a small percentage of acid, and then removing the precipitated albumen from the concentrated liquid from which it has been precipitated.

2. The herein-described process for producing soluble milk-albumen from whey, said process consisting in neutralizing the acidity of the whey, then reducing the whey containing the albumen and milk-sugar to the form of a heavy syrup, by evaporation at temperatures below the coagulating-point of the albumen, then separating the thickened or concentrated liquid from the crystallized milk-sugar therein, then precipitating the albumen from the concentrated liquid by the addition to such concentrated liquid of a small percentage of hydrochloric acid, and then removing the precipitated albumen from the concentrated liquid from which it has been precipitated.

3. The herein-described process for producing soluble milk-albumen, consisting in reducing the whey containing the albumen and milk-sugar to the form of a heavy syrup by evaporation at temperatures below the coagulating-point of the albumen, then separating the thickened or concentrated liquid from the crystallized milk-sugar therein, then precipitating the albumen from the concentrated liquid by the addition to such concentrated liquid of a small percentage of acid, then removing the precipitated albumen from the concentrated liquid from which it has been precipitated, by straining, then removing the excess of acid from the albumen by washing the latter, and then finally drying the albumen to put it in its preferable commercial condition.

In testimony whereof I affix my signature in presence of two witnesses.

HENRY V. DUNHAM.

Witnesses:
A. A. DUNHAM,
CHAS. DAHL.